United States Patent
Walline et al.

(10) Patent No.: US 10,440,719 B2
(45) Date of Patent: Oct. 8, 2019

(54) SYSTEM AND METHOD FOR POLICY BASED WIRELESS DOCKING ACCESS AND PRIORITIZATION

(71) Applicant: Dell Products, LP, Round Rock, TX (US)

(72) Inventors: Erin K. Walline, Pflugerville, TX (US); Rex W. Bryan, Round Rock, TX (US); Mandy C. Phelps, Austin, TX (US); Susan Herbstritt, Austin, TX (US); Sean P. O'Neal, Austin, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/991,882

(22) Filed: May 29, 2018

(65) Prior Publication Data
US 2018/0279290 A1  Sep. 27, 2018

Related U.S. Application Data

(63) Continuation of application No. 14/675,184, filed on Mar. 31, 2015, now Pat. No. 10,009,899.

(51) Int. Cl.
*H04W 72/04* (2009.01)
*H04W 12/06* (2009.01)
*H04W 12/00* (2009.01)

(52) U.S. Cl.
CPC ....... *H04W 72/048* (2013.01); *H04W 12/003* (2019.01); *H04W 12/06* (2013.01)

(58) Field of Classification Search
CPC .. H04W 72/048; H04W 12/06; H04W 12/003
USPC ....................................... 455/41.3
See application file for complete search history.

(56) References Cited

U.S. PATENT DOCUMENTS

| | | | |
|---|---|---|---|
| 2011/0276672 A1 | 11/2011 | Kwon | |
| 2013/0051382 A1* | 2/2013 | Derham | H04W 72/085 370/345 |
| 2016/0094664 A1 | 3/2016 | Olcese | |
| 2016/0175895 A1 | 6/2016 | Suzuki | |

* cited by examiner

*Primary Examiner* — Eugene Yun
(74) *Attorney, Agent, or Firm* — Prol Intellectual Property Law, PLLC; H. Kenneth Prol

(57) ABSTRACT

A method and device includes a scheduling controller receiving a request to reserve pairing with a device during a specific period of time, a memory storing a device identifier of a first information handling system in a scheduling table to associate the first information handling system with the device during the specific period of time, and providing connection details for the specific period of time to the first information handling system and the device, wherein the device and first information handling system can utilize the connection details to automatically pair any time after a start of the specific period of time.

20 Claims, 8 Drawing Sheets

SYSTEM AND METHOD FOR POLICY BASED WIRELESS DOCKING ACCESS AND PRIORITIZATION

This application is a continuation of prior application Ser. No. 14/675,184, entitled "System and Method for Policy Based Wireless Docking Access and Prioritization," filed on Mar. 31, 2015, which is assigned to the current assignee hereof and is incorporated herein by reference in its entirety.

FIELD OF THE DISCLOSURE

The present disclosure generally relates to system and method for policy based wireless docking access and prioritization.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Multiple information handling systems can wireless dock or pair with a single device at different times. A race-condition may arise to determine which information handling system is paired with the device if all of the information handling systems are within communication range of the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
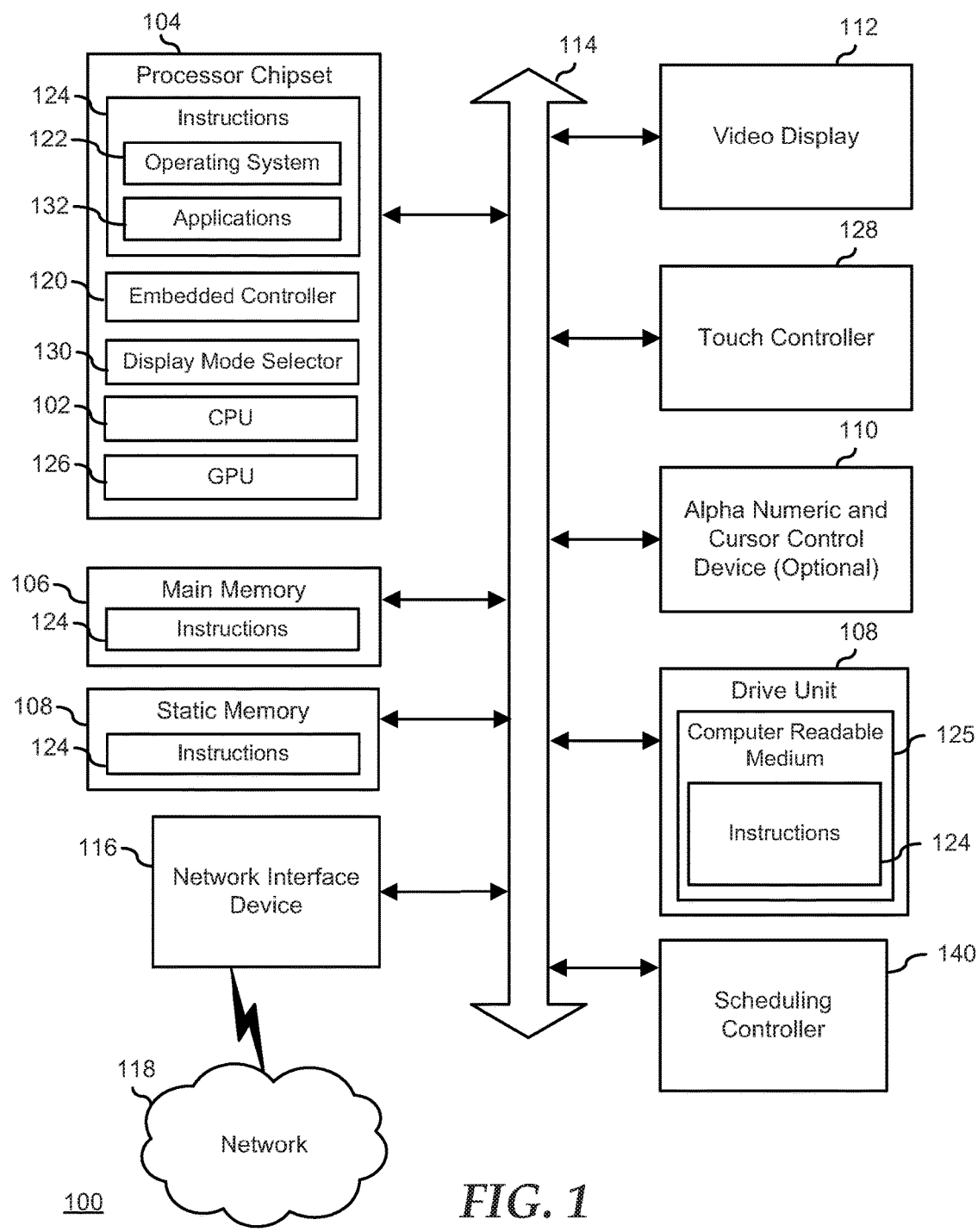
FIG. 1 is a block diagram of an information handling system according to at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, a communication system includes one or more information handling systems, an exchange server, and one or more devices according to at least one embodiment of the present disclosure. In an embodiment, the information handling systems may be a personal computer, a laptop computer, a tablet computer, a cellular telephone, or the like. In an embodiment, the device can be a projector, a monitor, a display device, a television, an audio device, a Wireless-Fidelity (Wi-Fi) access point, or the like. In an embodiment, an information handling system can communicate with the exchange server, and can provide a request to reserve pairing with a device for a specific period of time, such as one hour on a particular day and at a particular time.

The scheduling controller can receive the request from the information handling system, and can then determine whether the device is available during the specific period of time included in the request. If the device is not available, such as another information handling system has already reserved the device, the exchange server can provide the information handling system with a signal indicating that the request has been denied. If the device is available, the exchange server can reserve the device for pairing by the information handling system during the specific period of time indicated in the request. The scheduling controller can then determine whether the device is associated with a particular location, such as conference room. If the device is associated with a location, the scheduling controller can also reserve the location for use by an individual associated with the information handling system. Connection details can then be configured for the pairing during the specific period of time. Upon the connection details being configured, the exchange server can provide the pairing reservation details along with the connection details to the device.

Anytime after the start of the specific period of time, the information handling systems can automatically provide a pairing request with their respective passwords to the device. The device can receive the pairing requests with the passwords, and then compare the passwords to those stored in a memory. The device can then provide the proper access and/or control to the each of the information handling systems based on the provided passwords. A graphical user interface (GUI) can be displayed during the specific period of time and can include an output of the device, invitee icons, a count down timer, and extend time button. In an embodiment, the invitee icons can identify the information handling systems paired with the device.

In an embodiment, the invitee icons associated with the leader and presenters can be arranged to visually represent a presenting queue for control of the device. If the connection details includes that automatic transfer of control is enabled, the device can determine when it is time to transfer control to the next information handling system in the presenting queue and can then transfer control to the next information handling system in the presenter queue. In an embodiment, control of the device can also be transferred manually based on requests to transfer control being received from one of the information handling systems that is the current leader or presenter. In an embodiment, the GUI can also include invitee icons associated with attendees of a meeting associated with the reservation of the device. An attendee may be an information handling system that can connect or pair with the device, but that may not ever be grant access to control the output of the device.

In an embodiment, the count down timer can provide the individuals associated with the information handling systems with an indication of the amount of time remaining in the specific period of time that the information handling systems are paired with the device. An individual can select the extend time button to request additional pairing time between the device and the information handling systems. When the specific period of time has expired, the device can automatically disconnect from the information handling systems, and wait for another information handling system to send a pairing request with the proper password for that period of time.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, or the like), WIFI, WLAN, LAN, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include a several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. In several embodiments described herein, control of the location for rendering for software application windows and virtual tools in the display may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

A display mode selector 130, in connection with an application window locator system as described in more detail below, determines priority of concurrently running software applications and how to automatically locate software application display windows and virtual tools on the screen via the chipset 104 based upon orientation of the display screen 112 as well as the software applications 132 currently running and active and their status. Determining which applications 132 are running determines a working software application context. Alternatively, the application window locator may operate on an embedded controller 120 separate from the main CPU chipset(s) 104. Additionally, the power management application may receive state of usage activity input from device state sensors.

In an embodiment, the information handling system 100 may be an exchange server to communicate with multiple other information handling systems to schedule and/or reserve the ability of pairing two or more other information handling systems. In an embodiment, the information handling system 100 may be a personal computer, laptop computer, a tablet computer, a cellular telephone, or the like, to communicate with the exchange server to reserve the right to pair with a device during a specific period of time. In an embodiment, the information handling system 100 may be a projector, a monitor, a display device, a television, an audio output device, a Wi-Fi access point or router, or the like, to communicate with the exchange server to receive a schedule of reservations of the right of different information handling systems to pair with the device during a specific period of times. In each of these examples, the information handling system 100 can include a scheduling controller 140, which can utilize the network interface device 116 to communicate with other information handling systems to schedule and/or reserve the ability to of an information handling system to pair with a wireless device, such as a projector, a television, a monitor, an audio output device, or the like, during a specific period of time as discussed in more detail with respect to FIGS. 2-4 below.

Figure 2:
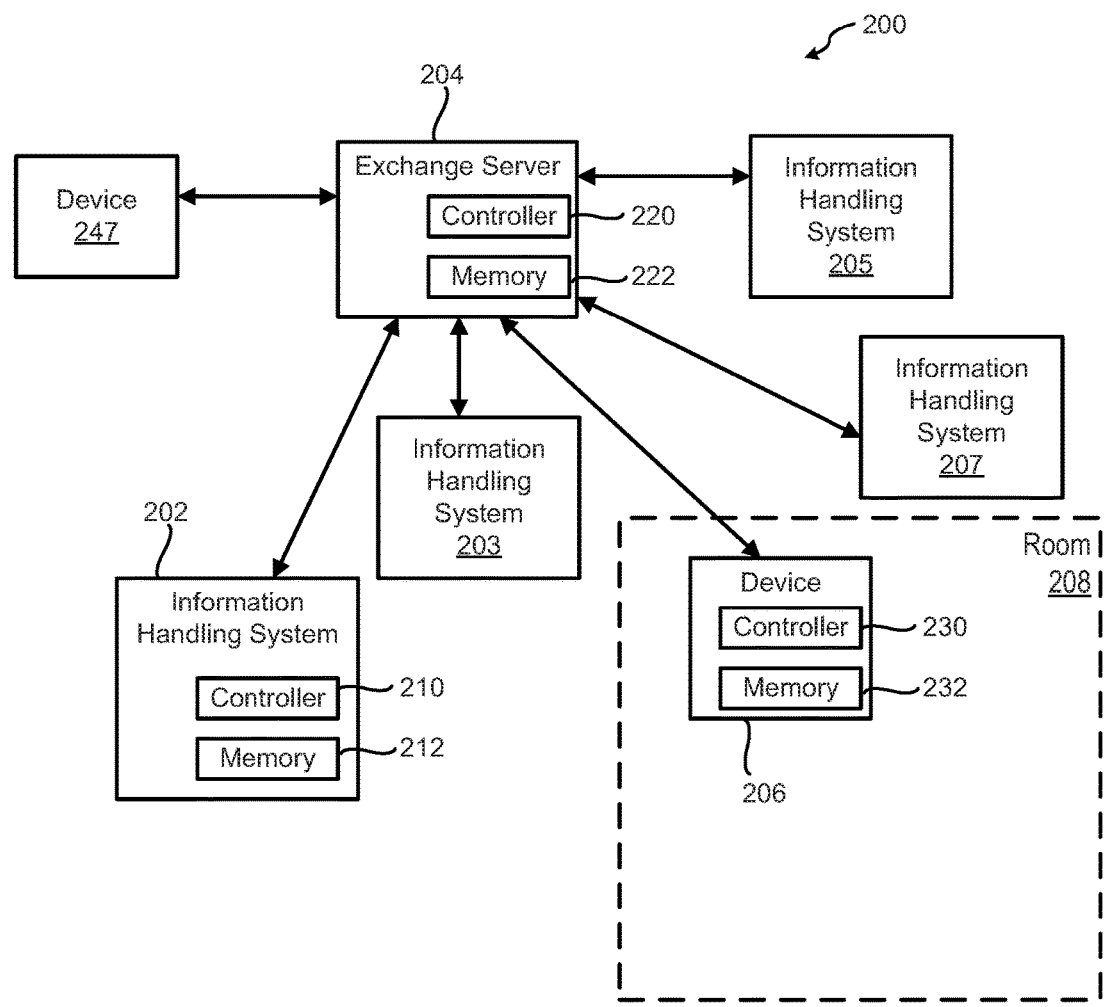
FIG. 2 is a block diagram of communication system including an information handling system and a device according to at least one embodiment of the present disclosure.

FIG. 2 illustrates a system 200 including information handling systems 202, 203, 205, and 207, an exchange server 204, and devices 206 and 247 according to at least one embodiment of the present disclosure. In an embodiment, the device 206 can be located within a particular location, such as a conference room 208. The information handling system 202 may include a scheduling controller 210 and a memory 212, the exchange server 204 may include a scheduling controller 220 and a memory 222, and the device 206 may include a scheduling controller 230 and a memory 232. In an embodiment, the information handling systems 203, 205, and 207 may be substantially similar to information handling system 202. Therefore, for brevity, only the components and operations of information handling system 202 will be described herein. In an embodiment, the device 247 may be substantially similar to device 206. Thus, for brevity, only the components and operations of device 206 will be described herein. In an embodiment, the exchange server 204 may communicate with the information handling systems 202, 203, 205, and 207, and with the devices 204 and 247. Each of the information handling systems 202, 203, 205, and 207 may communicate with each of the devices 206 and 247.

During operation, an individual may access the information handling system 202, such as a personal computer, a laptop computer, a tablet computer, a cellular telephone, or the like, and launch a scheduling application. In an embodiment, the scheduling application can be any type of application, such as an outlook calendar, that can record different scheduled events for the individual. The scheduling controller 210, along with other circuits and/or modules within the information handling system 202, can utilize the scheduling application to reserve the ability to pair with the device 206 at a future date and time. In an embodiment, the scheduling controller 210 can communicate with the scheduling controller 220 of the exchange server 204, and can provide a request to reserve the device 206 during a reservation time, such as a specific period of time. For example, a reservation time or specific period of time can be one hour on a particular day and at a particular time. In an embodiment, the scheduling controller of any information handling system 202, 203, 205, or 207, either device 206 or 247, or the exchange server 204 can receive and handle the granting or denying of requests to reserve the pairing with the device during a specific period of time. However, for brevity, the discussed of receiving and handling the requests to reserve pairing will be described with respect to the scheduling controller 220 of the exchange server 204.

The scheduling controller 220 can receive the request from the information handling system 202, and can then determine whether the device 206 is available during the specific period of time included in the request. In an embodiment, the scheduling controller 220 can access a scheduling table stored in the memory 222 to determine if the device 206 is available. In an embodiment, this scheduling table can include a list of all devices that can be reserved, and can also include a location, participant designations such as a leader, presenters, attendees, and corresponding periods of time that the device is already reserved for each device as shown in Table 1 below:

TABLE 1

Scheduling Table

| Device | Location | Leader | Presenters | Attendees | Time |
|---|---|---|---|---|---|
| ID 247 | N/A | ID 207 | ID 203, ID 205 | ID 207 | Tuesday (xx/xx/xx) 8:00 am-9:00 am |
|  |  | ID 203 |  |  | Wednesday (xx/xx/xx) 8:00 am-9:00 am |
| ID 206 | CR 208 |  |  |  |  |

In the example illustrated in Table 1 above, a device with a device identifier (ID) 247 can be reserved by an information handling system with a device ID of ID 207, the information handling can have the device ID 247 reserved on Tuesday (xx/xx/xx) from 8 am to 9 am, and can have enabled other information handling systems, such as ID 203 and 205, to be presenters so that these information handling systems can also connect with the device ID 247 during the specific period of time. In an embodiment, the device ID can be an Internet Protocol (IP) address associated with the information handling system or device, a Bluetooth ID, or the like. The scheduling table also includes the information that an information handling system, ID 207, is to attend a meeting at this specific time, but is not given permission to access and/or control the device ID 247. In this example, device ID 247 is not associated with any particular location.

Referring back to the request to reserve device 206 provided by the information handling system 202, the request can include the device ID, ID 206, for device 206, the device ID, ID 202, for the requesting information handling system, a specific period of time for the reservation, such as Monday (xx/xx/xx) 9:00 am-9:30 am, and any other information handling systems that should be able to connect with the device 206 or that should be in attendance at a meeting during the specific period of time, such as presenter ID 203, and attendees IDs 205 and 207. The scheduling controller 220 can utilize the scheduling table to determine whether the device 206 is available during the specific period of time. If in the above example, the device 206 was not available, such as another information handling system had already reserved the device 206, the scheduling controller 220 can provide the scheduling controller 210 of the information handling system 202 with a signal indicating that the request has been denied. The scheduling controller 220 can also determine that the device 206 is not currently reserved during the specific period of time, such that the information handling system 202 can reserve the device 206. In this situation, the scheduling controller 220 can reserve the device 208 for pairing by the information handling system 202 during the specific period of time indicated in the request. The scheduling controller 220 can then store the device ID for information handling system 202 in a section of the scheduling table associated with the device 206 along with the requested period of time. For example, the controller 220 can include the device ID, ID 202, for the information handling system 202 in the leader column of the scheduling table, the device ID for information handling system 203 in the presenter column, the device IDs for information handling systems 205 and 207 in the attendees column, and the time Monday (xx/xx/xx) 9:00 am-9:30 am in the time column as shown in Table 2 below:

a location, the scheduling controller 220 can also reserve the location for use by an individual associated with the information handling system 202.

After the device 206 has been reserved for pairing by the information handling system 202, the information handling system 202 can continue to communicate with the exchange server 204 to configure connection details between the information handling system 202 and the device 206. In an embodiment, the connection details can include: whether the information handling system 202 and the device 206 may automatically pair at the specific time; a password to authenticate pairing; a selected connection protocol, such as wireless-fidelity (Wi-Fi), wireless gigabit (WiGig), microcast, Bluetooth, or the like; whether automatic transfer of control between leader and presenters is enabled; or the like. The scheduling controller 210 can store the pairing reservation details and the connection details in memory 312 of the information handling system 302, and can provide the connection details to the exchange server 204.

Upon the connection details being configured, the exchange server 204 can provide the pairing reservation details, such as the device ID for the leader, the device IDs for the presenters, the device IDs for attendees, and the specific time, along with the connection details to the device 206. In the example illustrated in Table 2 above, the exchange server 204 can provide the scheduling controller 230 of the device 206 with the following information: ID 202 as the leader; ID 203 as a presenter; IDs 205 and 207 as attendees; the specific time as Monday (xx/xx/xx) 9:00 am-9:30 am; and the like. In an embodiment, the device IDs for the information handling systems 202, 203, 205, and 207, and the devices 206 and 247 can enable the information handling systems to communicate with the devices. The exchange server 204 can also provide the scheduling controller 230 of the device 206 with the following connection details: the password for automatic pairing; connection type is WiGig; enable automatic transfer of control; and the like. The scheduling controller 230 of device 206 can then store the pairing reservation details and the connection details in the memory 332. The exchange server 204 can also provide the pairing reservation details and connection details to each of the information handling system associated with the device IDs of the presenters or attendees, such as information handling systems 203, 205, and 207.

In an embodiment, the device IDs can be identifiers, such as IP addresses, Bluetooth device IDs, or the like, for the information handling systems and devices when on a network, such as an Internet network (wireless or wired), a Bluetooth communication network, or the like. For example, the system 200 can be an Internet network that includes multiple wireless access points that the information handling

TABLE 2

Scheduling Table

| Device | Location | Leader | Presenters | Attendees | Time |
|---|---|---|---|---|---|
| ID 247 | N/A | ID 207 | ID 203, ID 205 | ID 207 | Tuesday (xx/xx/xx) 8:00 am-9:00 am |
| | | ID 203 | | | Wednesday (xx/xx/xx) 8:00 am-9:00 am |
| ID 206 | CR 208 | ID 202 | ID 203 | ID 205, ID 207 | Monday (xx/xx/xx) 9:00 am-9:30 am |

The scheduling controller 220 can then determine whether the device 206 is associated with a particular location, such as conference room 208. If the device 206 is associated with systems 202, 203, 205, and 207, the exchange server 204, and the device 206 and 247 can utilize to connect to the wireless Internet network. When the information handling systems 202, 203, 205, and 207, the exchange server 204, and the device 206 and 247 connect to the network via an access point, each of the information handling systems 202, 203, 205, and 207, the exchange server 204, and the device 206 and 247 can provide its device ID. In an embodiment, the device IDs can remain constant between connections to the network, so that the scheduling table does not need to be update each time the information handling systems 202, 203, 205, and 207, and the device 206 and 247 connect to the network.

Figure 3:
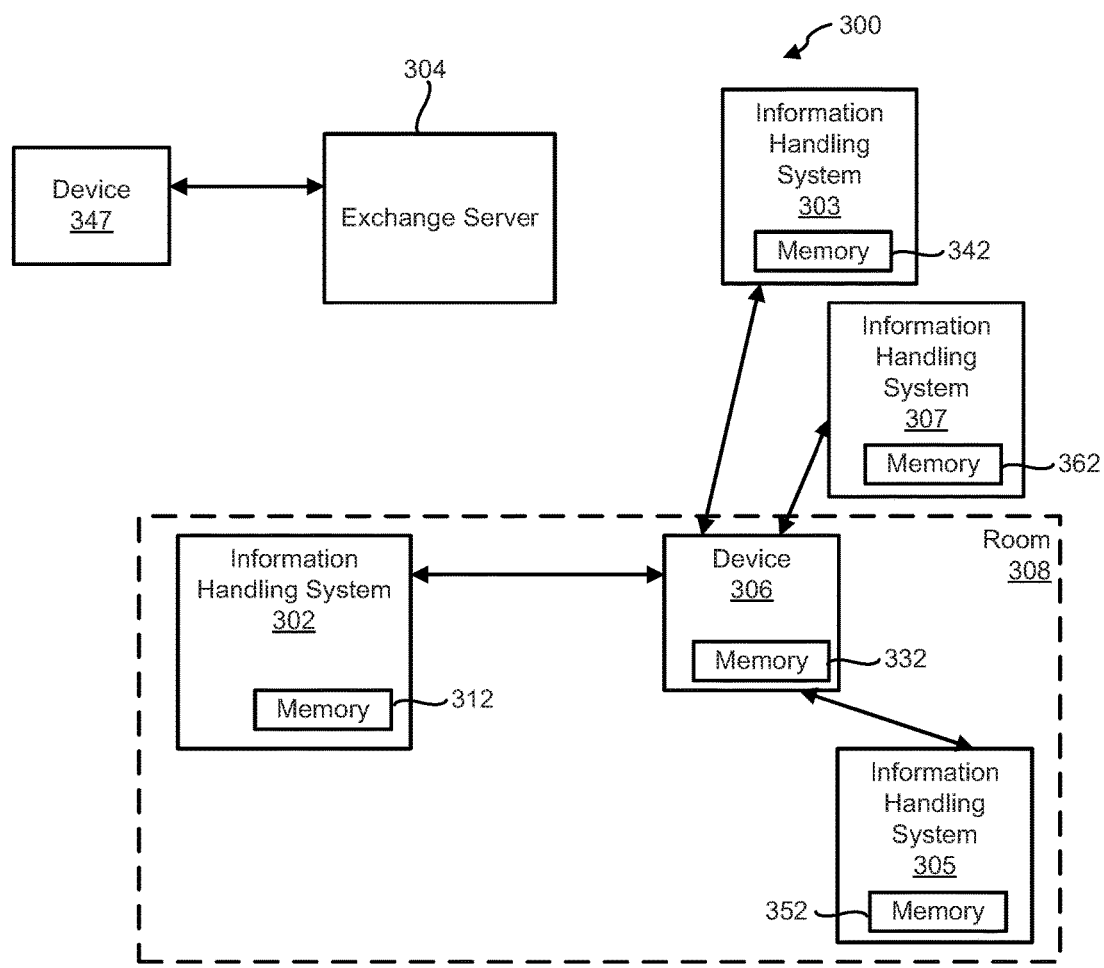
FIG. 3 is a block diagram of the communication system during a specific period of time according to at least one embodiment of the present disclosure.

FIG. 3 illustrates a communication system 300 during a specific period of time when a device is reserved for pairing according to at least one embodiment of the present disclosure. The communication system 300 includes information handling systems 302, 303, 305, and 307, an exchange server 304, and devices 306 and 347. The information handling systems 302, 303, 305, and 307 may each include a respective memory 312, 342, 352, and 362, and the device may include a memory 332. In the embodiment illustrated in FIG. 3, a specific period of time is reached for the device 306 to pair with the information handling systems 302, 303, 305, and 307. During this time period, the information handling systems 302, 303, 305, and 307 may or may not be in the same location as the device based on the connection being the WiGig connection. For example, information handling systems 302 and 305 may be in the location, such as conference room 308, but information handling systems 303 and 307 may be located somewhere else in the communication network 300. In this example, the information handling systems 302, 303, 305, and 307 may be located at different points within the communication network 300, but can still pair with the device 306 via one or more access points in the communication system 300.

Any time after a start of the specific period of time when the device 306 is reserved for pairing, the information handling systems 302, 303, 305, and 307 may retrieve a password stored in their respective memory 312, 342, 352, and 362. In an embodiment, the passwords may only be valid to pair the information handling systems 302, 303, 305, and 307 to the device 306 during in the specific period of time. In an embodiment, the passwords of the information handling systems 302, 303, 305, and 307 may vary depending on the rights or privileges assigned to the specific information handling system 302, 303, 305, or 307. For example, the information handling system 302 may have a different password than the other information handling systems 303, 305, and 307 based on the information handling system 302 being assigned as the leader in the pairing with the device 306. The information handling system 303 may have a different password than the other information handling systems 302, 305, and 307 based on the information handling system 303 being assigned as a presenter in the pairing with the device 306. Information handling systems 305 and 307 may have the same password based on the information handling systems 305 and 307 being assigned as attendees in the pairing with the device 306.

Any time after a start of the specific period of time, the information handling systems 302, 303, 305, and 307 can automatically provide a pairing request with their respective passwords to the device 306. The device 306 can receive the pairing requests with the passwords, and then compare the passwords to those stored in the memory 332. The device 306 can then provide the proper access and/or control to the each of the information handling systems 302, 303, 305, and 307 based on the provided passwords. Thus, the information handing system 302 can be automatically paired to the device 306 as the leader and/or controller of the device 306.

In an embodiment, the device 306 can be a projector, a monitor, a display device, a television, an audio output device, a Wi-Fi access point or router, or the like. In an embodiment, the leader and/or controller paired with the device 306 can provide data to the device 306 to be output. For example, if the device 306 is a projector, the information handling system 302 can provide images to be output by the device 306. In an embodiment, if the device 306 is a television, the information handling system 302 can provide images and audio to be output by the device 306. In an embodiment, if device 306 is an audio device, the information handling system 302 can provide audio data to be output by the device 306. In an embodiment, a graphical user interface (GUI), such as GUI 400 shown in FIG. 4, can be output by any combination of the information handling systems 302, 303, 305, and 307, and the device 306.

Figure 4:
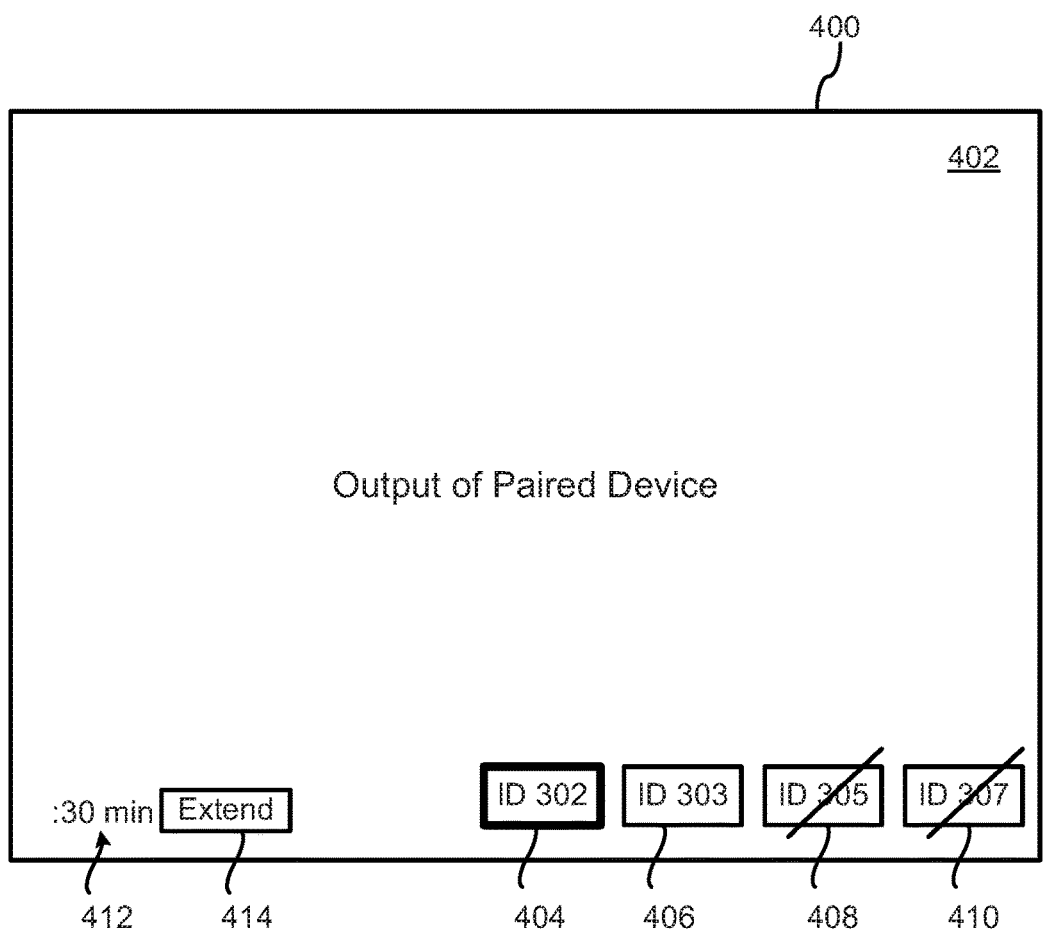
FIG. 4 is a block diagram of a graphical user interface output from the device during the specific period of time according to at least one embodiment of the present disclosure.

FIG. 4 illustrates a graphical user interface (GUI) 400 displayed during the specific period of time according to at least one embodiment of the present disclosure. The GUI 400 can include an output 402 of the device 306, invitee icons 404, 406, 408, and 410, a count down timer 412, and extend time button 414. In an embodiment, the invitee icons 404-410 can identify the information handling systems paired with the device 306. For example, invitee icon 404 includes device ID 302 for information handling system 302, invitee icon 406 includes device ID 303 for information handling system 303, invitee icon 408 includes device ID 305 for information handling system 305, and invitee icon 410 includes device ID 307 for information handling system 307.

The operation of the information handling systems 302, 303, 305, and 307 and the device 306 during the specific period of time will be discussed with respect to FIGS. 3 and 4. In an embodiment, the GUI 400 can be output by any combination of the information handling systems 302, 303, 305, and 307, and the device 306. In an embodiment, the invitee icon associated with the information handling system that is currently in control of the device 306, such as invitee icon 404 associated with information handling system 302, can be highlighted, bolded, or identified in any other manner as shown in the GUI 400. In an embodiment, the invitee icon associated with information handling systems that are presenters but that are not currently given control of the device 306, such as invitee icon 406 associated with information handling system 303, can be displayed next to the leader invitee icon. In an embodiment, the invitee icons associated with information handling systems that attendee but that are not provided with the ability to control of the device 306, such as invitee icons 408 and 410 associated with information handling systems 305 and 307, can have a line drawn through them or the like.

In an embodiment, the invitee icons associated with the leader and presenters, such as invitee icons 404 and 406, can be arranged to visually represent a presenting queue for control of the device 306. For example, the invitee icon 404 can indicate that information handling system 302 is first in the queue for controlling the device 306, and the invitee icon 406 can be next in line to represent that information handling system 303 is next in the queue for control of the device 306. If the connection details includes that automatic transfer of control is enabled, the device 306 can determine when it is time to transfer control to the next information handling system in the presenting queue and can then transfer control to the next information handling system in the presenter queue. This transfer of control can automatically take place by the device 306 without any requests being received from individuals associated with the information handling systems in the presenter queue, such as information handling systems 302 and 303.

In an embodiment, control of the device 306 can also be transferred manually based on requests to transfer control being received from one of the information handling systems that is the current leader or presenter. For example, the information handling system 302 can send a request to transfer control of the device 306 from the information handling system 302 to the information handling system 303. The device 306 can then transfer control to information handling system 303, and can switch places of the invitee icons 404 and 406 on the GUI 400, such that the invitee icon 406 is first in order of the presenter queue and is bolded or highlighted to indicate that the information handling system 303 is controlling the device 306.

In an embodiment, the current leader and/or controller of the device 306 can request to transfer control of the device 306 by clicking on or otherwise selecting the invitee icon associated with the information handling system to receive control of the device 306. For example, an individual of the information handling system 302 can select the invitee icon 406 to request transfer of control from information handling system 302 to information handling system 303.

In an embodiment, the count down timer 412 can provide the individuals associated with the information handling systems 302, 303, 305, and 307 with an indication of the amount of time remaining in the specific period of time that the information handling systems 302, 303, 305, and 307 are paired with the device 306. An individual can select the extend time button 414 to request additional pairing time between the device 306 and the information handling systems 302, 303, 305, and 307. In response to the extend time button 414 being selected, the exchange server 304 can receive a request to extend the period of time for pairing by a predetermined amount of time, such as 10 minutes, 15 minutes, 30 minutes, 40 minutes, or the like.

The exchange server 304 can receive the extension of time request and utilize the scheduling table to determine whether the device 306 is available for pairing during the extended period of time. If the device 306 is available, the exchange server 304 can update the scheduling table and provide the updated time to each of the device 306 and the information handling systems 302, 303, 305, and 307. However, if the device 306 is not available for pairing during the extended period of time, the can deny the request.

When the specific period of time has expired, the device 306 can automatically disconnect from the information handling systems 302, 303, 305, and 307, and wait for another information handling system to send a pairing request with the proper password for that period of time.

Figure 5:
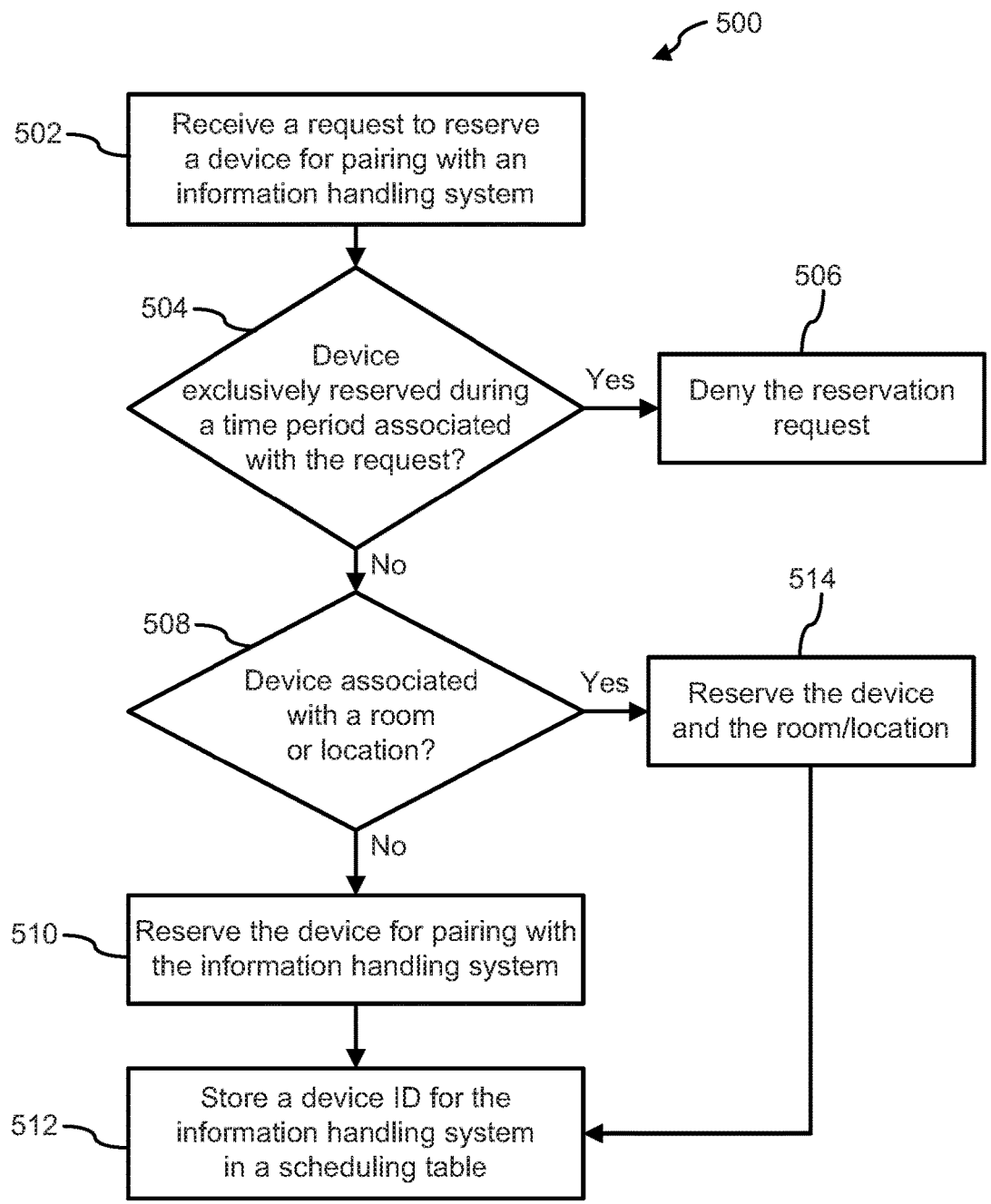
FIG. 5 is a flow diagram of a method for reserving a device for pairing with an information handling system according to at least one embodiment of the present disclosure.

FIG. 5 is a flow diagram of a method for reserving a device for pairing with an information handling system according to at least one embodiment of the present disclosure. At block 502, a request to reserve pairing of a device with an information handling system is received. In an embodiment, the information handling system may be a personal computer, a laptop computer, a tablet computer, a cellular telephone, or the like. In an embodiment, the device can be a projector, a monitor, a display device, a television, an audio output device, a Wi-Fi access point or router, or the like. In an embodiment, an information handling system can communicate with an exchange server to provide the request to reserve pairing with the device for a specific period of time, such as one hour on a particular day and at a particular time. At block 504, a determination is made whether the device is currently reserved for pairing during the specific period of time associated with the request. If the device is currently reserved during the specific period of time, the request to reserve the device is denied at block 506.

If the device is not currently reserved during the specific period of time, a determination is made whether the device is associated with a particular room or location at block 508. In an embodiment, the room or location can be a conference room of a building. If the device is not associated with a particular room or location, the device is reserved for pairing with the information handling system at block 510. At block 512, a device identifier for the information handling system is stored in scheduling table. In an embodiment, the scheduling table can be stored in one or all of the following: an exchange server; the information handling system; the device; or the like. If at block 508, the device is associated with a room or location, the device is reserved for pairing with the information handling system, and the room and/or location is reserved for use by an individual associated with the information handling system at block 514. The flow then continues as stated above at block 512.

Figure 6:
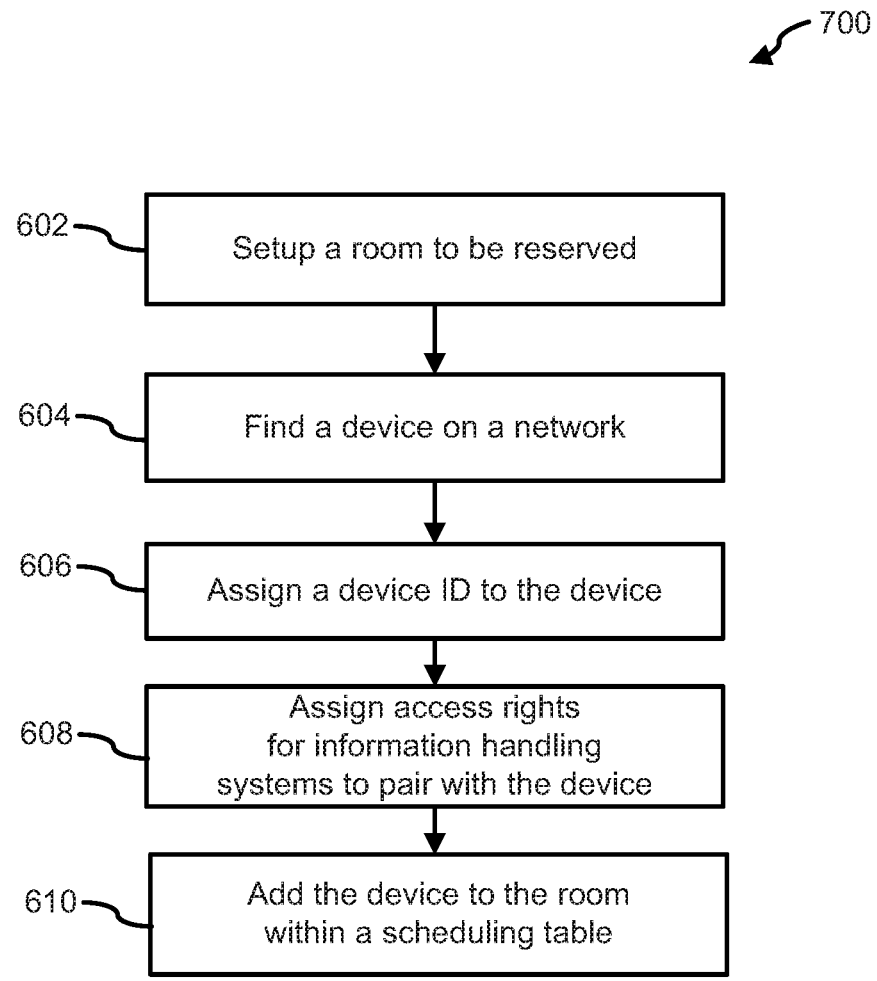
FIG. 6 is a flow diagram of a method for setting up a room or location to be reserved along with a device within the room according to at least one embodiment of the present disclosure.

FIG. 6 is a flow diagram of a method for setting up a room or location to be reserved along with a device within the room according to at least one embodiment of the present disclosure. At block 602, a room is setup to be reserved. In an embodiment, the room can be a conference room in a building or the like. In an embodiment, setting the room up to be reserved can include adding an identifier for the room to a scheduling table. A device on a network is found at block 604. In an embodiment, the device can be a projector, a monitor, a display device, a television, an audio output device, a Wi-Fi access point or router, or the like.

At block 606, a device identifier (ID) is assigned to the device. In an embodiment, the device ID for the device can be stored in the scheduling table. Access rights to the device can be assigned for different information handling systems in the network at block 608. In an embodiment, the access rights can include whether an information handling can control an output of the device, can pair with the device without controlling the device, cannot pair with the device, or the like. At block 610, the device is added to the room in the scheduling table. In an embodiment, the device and room should be reserved together in response to the device and the room being associated with each other in the scheduling table.

Figure 7:
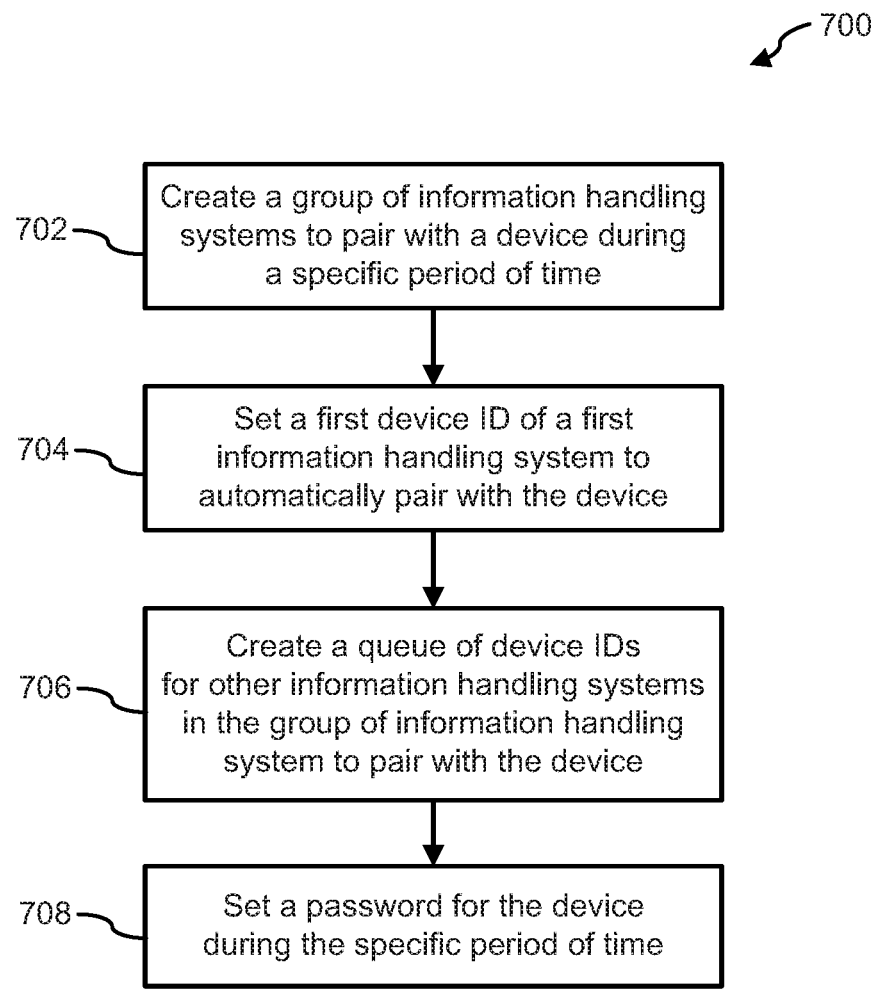
FIG. 7 is a flow diagram of a method for pre-pairing the information handling system with the device according to at least one embodiment of the present disclosure.

FIG. 7 is a flow diagram of a method for pre-pairing the information handling system with the device according to at least one embodiment of the present disclosure. At block 702, a group of information handlings systems that can pair with a device during a specific period of time is created. In an embodiment, an information handling system may be a personal computer, a laptop computer, a tablet computer, a cellular telephone, or the like. In an embodiment, the device can be a projector, a monitor, a display device, a television, an audio output device, a Wi-Fi access point or router, or the like. In an embodiment, an exchange server can create the group of information handling systems that can pair with the device for the specific period of time. In an embodiment, the specific amount of time can be a set amount of time on a particular day and at a particular start time.

At block 704, a first device identifier (ID) for a first information handling system is set to automatically pair with the device during the specific period of time. At block 706, a queue of device IDs of the group of information handling systems is created. In an embodiment, the queue controls the order in which each of the information handlings systems of the group of information handling systems is able to control the output of the device. At block 708, a password for pairing with the device during the specific period of time is set. In an embodiment, the password to authenticate pairing during the specific period of time can be optional, such that the information handling system may pair with the device without a password.

Figure 8:
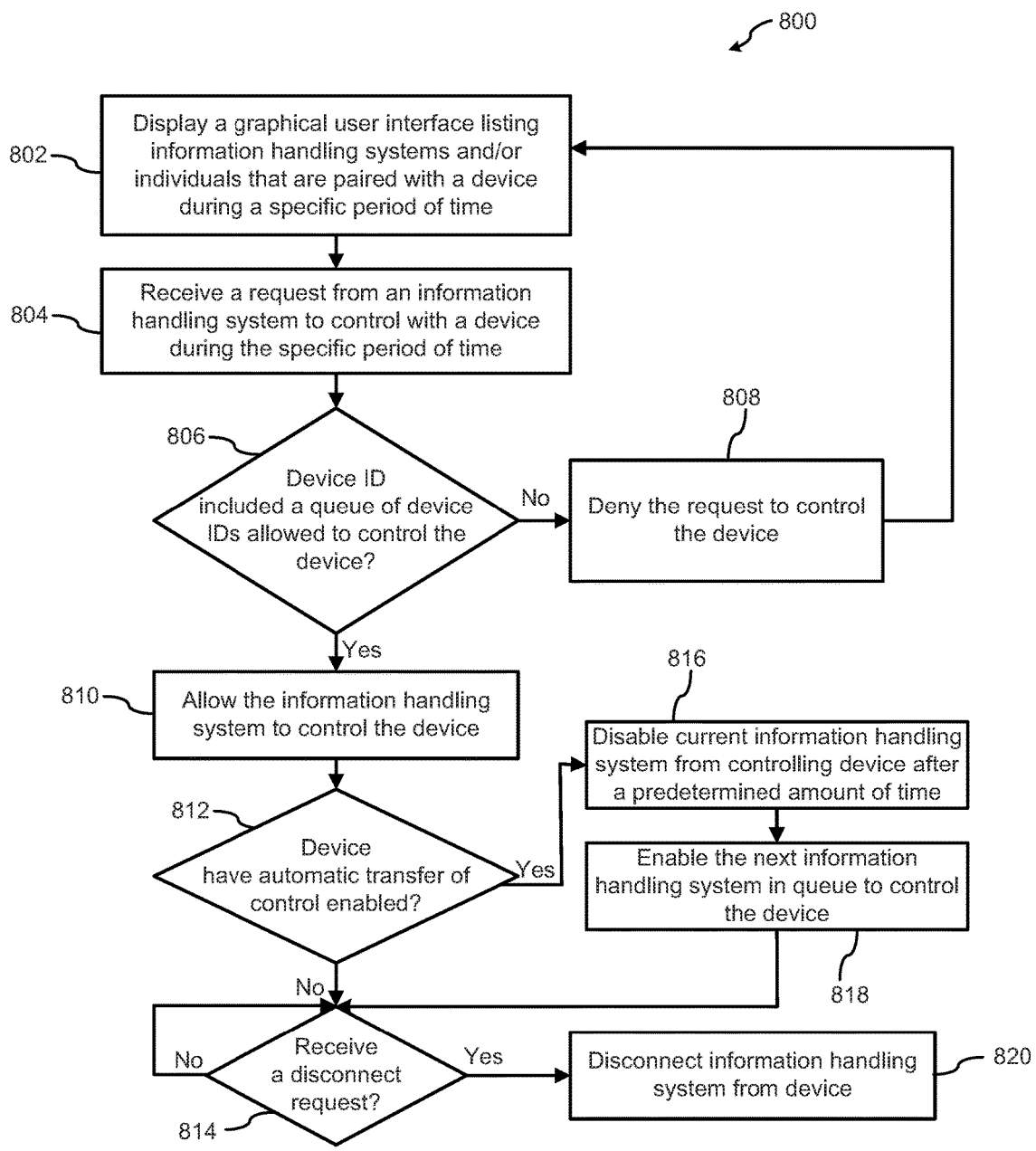
FIG. 8 is a flow diagram of a method for controlling the device by multiple information handling systems during the specific period of time according to at least one embodiment of the present disclosure.

FIG. 8 is a flow diagram of a method for controlling the device by multiple information handling systems during a specific period of time according to at least one embodiment of the present disclosure. At block 802, a graphical user interface listing information handling systems that are paired with a device during a specific period of time. In an embodiment, graphical user interface can be displayed by one or more of the information handling systems and the device. In an embodiment, the information handling system may be a personal computer, a laptop computer, a tablet computer, a cellular telephone, or the like. In an embodiment, the device can be a projector, a monitor, a display device, a television, an audio output device, a Wi-Fi access point or router, or the like. At block 804, a request to control the device is received from an information handling system. In an embodiment, the request to control includes a device identifier (ID) associated with the information handling system making the request.

At block 806, a determination is made whether the device ID is included in a queue of device IDs allowed to control the device. If the device ID is not in queue, the request to control the device is denied at block 808. In an embodiment, control of the device can include controlling the output of the device, controlling whether additional information handling systems can pair with the device, or the like. If the device ID is included in the queue, information handling system is allowed to control the device at block 810. At block 812, a determination is made whether the device has automatic transfer of control enabled. If the device does not have automatic transfer of control enable, a determination is made whether a disconnect request is received at block 814. However, if the device does have automatic transfer of control enabled, control of the device by the current information handling system is disabled after a predetermined amount of time at block 816. At block 818, a next information handling system in the queue is enabled to control the device, and the flow continues as described above at block 814. If a disconnect request is received, the information handling system is disconnected at block 816. In an embodiment, if the specific period of time ends, all information handling systems paired with the device are disconnected.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a scheduling controller, a reservation for pairing with a device during a reservation for pairing period beginning at a specified day and time-of-day;
storing, by the scheduling controller, a device identifier of a first information handling system in a scheduling table to associate the first information handling system with the device during the reservation for pairing; and
providing, by the scheduling controller, connection details for the reservation for pairing period to the first information handling system and the device, wherein the device and first information handling system can utilize the connection details to automatically pair any time after a start of the specified day and time-of-day of the reservation for pairing.

2. The method of claim 1, further comprising:
providing, by the scheduling controller, authentication information for the reservation for pairing period to the information handling system and the device.

3. The method of claim 1, further comprising:
determining whether the device is associated with a location; and
if the device is associated with the location, reserving the location for use by an individual associated with the information handling system during the reservation for pairing period.

4. The method of claim 1, wherein the request to reserve the device includes an identification of a second information handling system as a presenter during the reservation for pairing period, and identification of a third information handling system as an attendee during the reservation for pairing period, wherein the presenter is placed in a queue of information handling systems waiting to be granted control of the device, wherein the attendee is to pair with the device without being granted control of the device.

5. The method of claim 1, further comprising:
determining, by the scheduling controller, whether the device is currently reserved during the reservation for pairing period prior to storing the device identifier for the first information handling system in the scheduling table.

6. The method of claim 1, further comprising:
configuring the connection details, wherein the connection details include whether the first information handling system and the device may automatically pair any time after the start of the reservation for pairing period, a password to authenticate pairing, a selected connection protocol, and whether automatic transfer of control between information handling systems in a queue is enabled.

7. The method of claim 1, further comprising:
providing, by the scheduling controller, an option on the first information handling system to extend the reservation for pairing period via a graphic user interface.

8. A device comprising:
a scheduling controller to receiving a request to reserve pairing with a device during a reservation for pairing period beginning at a specified day and time-of-day;
a memory for storing at the scheduling controller a device identifier of a first information handling system in a scheduling table to associate the first information handling system with the device during the reservation for pairing period; and
the scheduling controller to provide connection details for the reservation for pairing period to the first information handling system and the device, wherein the device and first information handling system can utilize the connection details to automatically pair any time after the beginning of the reservation for pairing period.

9. The device of claim 8, further comprising:
the scheduling controller to provide authentication information for the reservation for pairing period to the information handling system and the device.

10. The device of claim 8, further comprising:
the scheduling controller to determine whether the device is associated with a location and if the device is associated with the location, reserving the location for use by an individual associated with the information handling system during the reservation for pairing period.

11. The device of claim 8, wherein the request to reserve the device includes an identification of a second information handling system as a presenter during the reservation for pairing period, and identification of a third information handling system as an attendee during the reservation for pairing period, wherein the presenter is placed in a queue of information handling systems waiting to be granted control of the device, wherein the attendee is to pair with the device without being granted control of the device.

12. The device of claim 8, further comprising:
the scheduling controller determines whether the device is currently reserved during the reservation for pairing period prior to storing the device identifier for the first information handling system in the scheduling table.

13. The device of claim 8, further comprising:
the scheduling controller to configure the connection details, wherein the connection details include whether the first information handling system and the device may automatically pair any time after the beginning of the reservation for pairing period, a password to authenticate pairing, a selected connection protocol, and whether automatic transfer of control between information handling systems in a queue is enabled.

14. The device of claim 8, wherein the device is selected from a group consisting of a projector, a monitor, a display device, and an audio player.

15. An exchange server operating a scheduling controller comprising:
the scheduling controller operating on the exchange server to receive from a first information handling system a request to reserve pairing with a device during a reservation for pairing period having a beginning at a specified day and time-of-day for the first information handling system;
a memory storing a device identifier of the first information handling system in a scheduling table to associate the first information handling system with the device during the reservation for pairing period; and
the scheduling controller transmitting connection details for the reservation for pairing period to the first information handling system and the device, wherein the device and first information handling system can utilize the connection details to automatically pair any time after the beginning of the reservation for pairing period.

16. The exchange server of claim 15, further comprising:
providing, by the scheduling controller, authentication information for the reservation for pairing period to the information handling system and the device.

17. The exchange server of claim 15, further comprising:
determining whether the device is associated with a location; and
if the device is associated with the location, reserving the location for use by an individual associated with the information handling system during the reservation for pairing period.

18. The exchange server of claim 15, further comprising:
the scheduling controller operating on the exchange server to receive a device identifier of a second information handling system reserved to pair with the device during the reservation for pairing period similar to the first information handling system, wherein the device identifiers of the first information handling system and the second information handling system are designated as presenters during the reservation for pairing period; and
a memory for a placing the presenter second information handling system a queue of information handling systems waiting to be granted control of the device.

19. The exchange server of claim 15, further comprising:
the scheduling controller to receive a device identifier of a second information handling system as an attendee during the reservation for pairing period, wherein the attendee is to pair with the device without being granted control of the device.

20. The exchange server of claim 15, further comprising:
determining, by the scheduling controller, whether the device is currently reserved during the reservation for pairing period prior to storing the device identifier for the first information handling system in the scheduling table.

* * * * *